United States Patent Office 3,635,868
Patented Jan. 18, 1972

3,635,868
STABLE AQUEOUS EMULSIONS OF FUNCTIONAL GRAFT POLYMERS FROM VINYL LACTAM POLYMERS
Eugene S. Barabas, Watchung, and Marvin M. Fein, Westfield, N.J., assignors to GAF Corporation, New York, N.Y.
No Drawing. Filed May 4, 1970, Ser. No. 34,569
Int. Cl. C08f 19/00, 19/02
U.S. Cl. 260—29.6 RW    10 Claims

ABSTRACT OF THE DISCLOSURE

Stable aqueous emulsions comprising grafted terpolymers of a polymeric N-vinyl lactam, such as polyvinyl pyrrolidone, with an arylalkene (e.g. styrene or vinyl toluene) and a vinyl ketone (e.g. methyl vinyl ketone).

BACKGROUND OF THE INVENTION

Field of the invention

The present invention relates to stable, aqueous emulsions comprising a grafted polymeric N-vinyl lactam containing comonomers grafted thereon.

Grafted polymers comprising a basic homopolymer chain containing grafted thereon units or a plurality of units of one or more polymerizable monomers represent an interesting and important development in the resin arts, particularly since such grafted polymers find immediate and practical utility for the resin chemist to utilize them as 'building block" resin systems or "module" resin systems which can be employed to "tailor-make" subsequent resin systems to suit specific industrial needs. Grafted copolymers can be made by a variety of polymerization methods including solution, emulsion or bulk polymerization and the like. In the case of polymeric N-vinyl lactams, and particularly polyvinyl pyrrolidone, their use has been limited to a great extent to those fields of utility which take adavntage of the inherent physical characteristics of polyvinyl pyrrolidone, the most important of which is its water solubility. While this physical characteristic of water solubility has projected polyvinyl pyrrolidone into a position of prominence for such industrial applications as pharmaceutical, cosmetic, textile, lithographic uses, it conversely precluded its use in industrial application where water-insolubility of the resin system is a prerequisite.

The copolymerization of methyl vinyl ketone with styrene is also described in the literature in British Pat. No. 476,312 and J. Polymer Sci., vol., 8, page 495 (1952). However, graft terpolymers of these comonomers with polymeric N-vinyl lactams to produce functional sites thereon are believed novel.

SUMMARY OF THE INVENTION

Accordingly, it is one object of this invention to provide water-insoluble compositions based on polymeric N-vinyl lactams.

Another object of this invention resides in the provision of stable aqueous emulsions of polymeric N-vinyl lactams.

Yet another object of this invention resides in the provision of stable aqueous emulsions comprising a polymeric N-vinyl lactam with grafted sidechains containing arylalkene and vinyl ketone units.

Other objects and advantages of the invention will become apparent as the description thereof proceeds.

In satisfaction of the above-defined objects, there is provided by this invention stable aqueous emulsion lactices comprising a polymeric N-vinyl lactam with grafted sidechains containing arylalkene and vinyl ketone units.

DESCRIPTION OF PREFERRED EMBODIMENTS

The novel terpolymers of the present invention find applicability for use as cast films which are transparent, colorless and flexible. The films which are deposited are strong and clear and can be produced directly upon evaporation of the emulsions at room temperatures. The materials are also eminently useful as filaments protective coatings, impregnants and permanent sizing agents for paper, leather and the like. Still other useful applications of the emulsions of the invention include their use as pastes or dispersions in hot dip coating, slush casting and cellular elastomer applications.

In addition, units containing the carbonyl group represent a functionality through which the polymer may be subjected to various chemical reactions, characteristic to ketones, yielding a variety of products. The polymer may also be crosslinked through the functional groups by bifunctional compounds, by heat treatment or by other ways known in the art. By such treatment films, filaments and other objects of increased solvent resistance may be prepared.

Poly (styrene) latices are widely used, especially where good chemical stability and electrical properties of the product are pre-requisites. The functional group introduced into the polymers of present invention makes the polymers crosslinkable, thus improving several physical properties of the polymer; durability, solvent resistance, etc.

Due to its high reactivity the keto-group is eminently suitable for crosslinking, e.g., through glycols, primary diamines, alkanol amines, etc.

The polymeric N-vinyl lactams utilized in the preparation of the compositions of this invention are characterized by the following general structural formula:

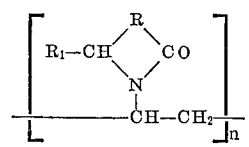

wherein R represents an alkylene bridge group of 2 to 4 carbon atoms necessary to complete a 5, 6 or 7-membered heterocyclic ring system, $R_1$ represents either hydrogen or an alkyl group, and $n$ represents a number indicative of the extent of polymerization.

All of the specific polymeric materials characterized by the foregoing general formula are commercially available and called polymeric N-vinyl lactams. They are obtained by polymerizing organic 5, 6 or 7-membered ring compounds containing in their rings the —NH—CO— group, such as, for example, N-vinyl-2-pyrrolidone, N-vinyl-5-methyl-2-pyrrolidone, N-vinyl-2-piperidone, N-vinyl-ε-caprolactam, and the like. Depending upon the extent of polymerization, polymers having molecular weights ranging from at least 400 up to 2,000,000 or more may be produced. Viscosity measurements are commonly used as an indication of the average molecular weight of polymeric compositions, the instant polymers being characterized by a chain of carbon atoms to which the lactam rings are attached through their nitrogen atoms:

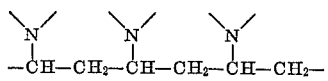

The K value (Fikentscher) of any particular mixture of polymers is calculated from viscosity data and is useful as an indication of the average molecular weight of such mixture. Its determination is fully described in "Modern Plastics," 23, No. 3, 157–61, 212, 214, 216, 218 (1945), and is defined as 1000 times $k$ in the empirical relative viscosity equation:

$$\frac{\log_{10} \eta_{rel}}{C} = \frac{75k^3}{1+1.5\,kC} + k$$

wherein C is the concentration in grams per hundred cc. of polymer solution and $\eta_{rel}$ is the ratio of the viscosity of the solution to that of pure solvent. The K values are reported as 1000 times the calculated viscosity coefficient in order to avoid the use of decimals. For the purpose of the present invention, there may be employed those polymeric N-vinyl lactams having a K value of about 10 to 200, preferably of 30 to 100 because of their viscosity at lower concentrations.

K values and specific viscosities ($\eta_{sp}$) are inter-convertible and are related through relative viscosity ($\eta_{rel}$). Thus, when viscosity measurements are taken on solutions which have a concentration of 1.00 gram of polymer per deciliter of solution at 25° C. (C=1), the relationships are as follows:

$$\eta_{rel} = \eta_{sp} + 1$$

Relative viscosity=specific viscosity plus one.
Relative viscosity $$= 10[0.001K + 0.000075K^2/(1+0.0015K)]$$

Hence, $\eta_{sp}$ $$= -1 + 10[0.001K + 0.000075K^2/(1+0.0015K)]$$

Relative viscosity, specific viscosity and K are dimensionless, whereas inherent viscosity $$\frac{(\log_e \eta_{rel})}{C}$$

and intrinsic viscosity (the limit of inherent viscosity as C approaches zero) have the dimensions of dilution, i.e., the reciprocal of concentration. Intrinsic viscosity and K are intended to be independent of concentration.

The number of recurring polymer units enclosed by brackets in the foregoing general structural formula, indicated by "$n$," or the extent of degree of polymerization, corresponds to a chain of roughly 4 to 20,000 monomer units or more. In actual practice, a mixture of polymeric molecules, each containing a different number ($n$) of monomer units, is always produced. These polymers and their methods of preparation are well known in the art. For example, they may be readily prepared by the procedural steps given in U.S. Pats. 2,265,450; 2,317,804; and 2,335,454 and in which working examples, species characterized by the above formula are provided and which disclosures are incorporated herein by reference.

The polymeric N-vinyl lactam described above is reacted with two separate comonomers in an aqueous medium in forming the terpolymer latices of this invention. One of these comonomer reactants is an arylalkene of the following formula:

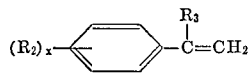

wherein $R_2$ and $R_3$ are hydrogen or alkyl groups of 1 to about 7 carbon atoms and $x$ is 0 or an integer of 1 to 5. Preferred comonomer reactants within this formula are styrene or the vinyl toluenes (m- or p-methylstyrene), although equivalent comonomers may also be employed such as alpha-methylstyrene and the like. Mixtures may also be employed.

The other comonomer reactant is an alkyl or aryl vinyl ketone of the formula:

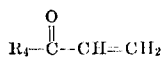

wherein $R_4$ is alkyl of 1 to about 7 carbon atoms or phenyl. The preferred ketone is methyl vinyl ketone because of its ready availability and excellent properties of the resulting products. This comonomer is extremely important in formation of the terpolymers as it provides the necessary carbonyl functional site discussed hereinabove. Mixtures of ketones may also be used.

The terpolymers are produced by reaction in an aqueous medium under aqueous dispersion conditions. The composition of the graft terpolymer can be varied over a wide range to provide latices having a broad spectrum of properties by using the polymeric N-vinyl lactam and comonomers in different ratios, varying the ratio of the comonomers or combinations thereof. The amounts of each of the reactants employed may range as follows based on the total weight of the polymer:

|  | Wt. percent |
|---|---|
| Polymeric N-vinyl lactam | 20–60 |
| Arylalkene | 40–80 |
| Vinyl ketone | 1–15 |

Especially preferred ratios of the reactants are about 30–50 weight percent of the polymeric N-vinyl lactam, 50–70 weight percent of the arylalkene and 1–7% of the vinyl ketone.

The arrangement of the monomer units is an essential part of this invention. In the polymers described in the present invention, the units of vinyl pyrrolidone are in the main-chain, while the side-chains are composed of the units of styrene (or vinyl toluene) and the units of methyl vinyl ketone. These side-chains are attached to the main-chain-poly (vinyl pyrrolidone) by grafting techniques.

The new graft terpolymer emulsions are conveniently prepared by subjecting a suitable mixture of the polymeric N-vinyl lactam, arylalkene and alkyl vinyl ketone to conditions fostering polymerization through the ethylenically unsaturated groups. The polymerization may be induced by high energy radiation or by the action of free radicals as described hereinafter.

The activation of the polymeric substrate by treatment with ammonium or potassium persulfate at around 100° C. is an important part of this invention. By this treatment active sites are created on the polymer chain which makes the grafting of the arylalkene and vinyl ketone units possible.

For the preparation of the emulsions of the invention, the polymerizations are carried out in aqueous dispersion, in the presence preferably of a water-soluble initiator such as potassium persulfate, ammonium persulfate, similar initiators or other known free radicals, or by use of high energy radiation (X-rays, gamma-rays) and advantageously also in the presence of a surface-active agent to facilitate solubilization of the comonomers. The preferred practice is to first prepare an aqueous solution containing the polymeric N-vinyl lactam, the initiator and the surface active agent, obtain solution, heat the solution to the desired temperature, and then add the monomers in admixture gradually to the reaction mixture, or add separately gradually and at such rate that the respective monomers are completely added at the end of any stated time period. The reaction is preferably carried out in the absence of free oxygen and most preferably under a blanket of neutral gas (e.g. nitrogen, argon, etc.). After completion of the addition of all of the monomers, the reaction mixture is then heated for a period up to several hours or more to complete the reaction. Preferred reaction temperatures range from −10 to 180° C. and most preferably from 65–75° C. to avoid violent reaction and undesirable side reactions. The resulting stable aqueous emulsion contains the resinous interpolymers, above-defined, in the form of small particles or beads measuring in diameter about from 100 to 300 millimicrons. If desired, an activating agent such as an alkali metal sulfite or bisulfite, e.g., sodium, potassium, etc., sulfites and metabisulfites can be added to the polymerization reaction mixture in about the same amount as the polymerization initiator in which case lower polymerization temperatures may be used. Chain regulators such as hexyl, cetyl, dodecyl, myristyl, etc., mercaptans can also be employed in the polymerizations.

Suitable surface-active agents which can be used include Igepal CO–630 (a commercial surfactant), fatty acid soaps, fatty alcohol sulfates such as sodium lauryl sulfate, potassium lauryl sulfate, etc., alkali metal salts or aromatic sulfonic acids, e.g., sodium isobutylnaphthalene sulfonate, etc., phosphate esters of polyethoxy alkylphenols, sulfosuccinic esters, γ-stearaminopropyl, dimethyl β-hydroxyethyl ammonium chloride, and the like.

The emulsions can also be compounded with additives such as pigments, salts, wetting agents, resins, waxes and the like, thus providing a wide spectrum of products having wide industrial application.

It has also been found that stable emulsions of the class described above can be prepared without the use of emulsifying agents or protective colloids, although it has been observed that it is preferable to add such materials to the emulsion recipe in order to obtain high conversions and greater stability of the resultant emulsions.

The following examples will serve to illustrate the practice of the invention:

EXAMPLE 1

Apparatus: 1 liter resin kettle, equipped with mechanical stirrer, reflux condenser, thermometer, gas inlet tube and graduated dropping funnel.

Procedure: Distilled water, 356 grams, was charged into the resin kettle, 96 grams polyvinylpyrrolidone (K–30), and 6 grams Igepal CO–630 surfactant were added, and the mixture was stirred until solution was obtained. After that, the system was purged thoroughly with nitrogen. The temperature was increased to 60° C., at which point 1 gram ammonium persulfate was introduced. The temperature was increased to 100° C., and this temperature was maintained for 30 minutes. After that the system was cooled to 70° C.

A mixture consisting of 136.8 grams styrene, 7.2 grams methyl vinyl ketone, and 6 grams Igepal CO–630 surfactant was added to the contents of the resin kettle gradually in 1½ hours at 70° C. After the addition was completed, the reaction was continued at 70° C. for one more hour. At this point 3 ml. of a 5% solution of ammonium persulfate was added. The addition of the catalyst was repeated one hour later. After one more hour at 70° C. the mixture was allowed to cool to room temperature. The white milky latex was discharged through cheese cloth.

EXAMPLE II

Apparatus: As described in Example I.

Procedure: Distilled water, 356 grams, was charged into the resin kettle, 72 grams polyvinylpyrrolidone (K–30), and 6 grams Igepal CO–630 surfactant were added, and the mixture was stirred until clear solution was obtained. After that the system was purged thoroughly with nitrogen. The temperature was increaed to 60° C., at which point 0.75 gram ammonium peraulfate was added. The temperature was increased to 100° C., and this temperature was maintained for 30 minutes. After that the system was cooled to 70° C.

The addition of the monomer started at this temperature. The mixture (136.8 grams vinyl toluene and 7.2 grams methyl vinyl ketone) was added in three increments of 38 grams each. The first part was added in 45 minutes. When the addition was over the mixture was allowed to react at 70° C. for 15 minutes, then 1.4 ml. of a 5% ammonium persulfate solution was added. The mixture was allowed to react for 15 more minutes, then the addition was resumed. This procedure, as described above, was repeated twice more. When all the monomer was in, the reaction was continued for 2 more hours. Then the milky, white latex was cooled, and discharged.

It will be apparent that in place of the polyvinyl pyrrolidone having a potential K value of 30, employed in the foregoing examples, other poylmeric N-vinyl lactams or polyvinyl pyrrolidone having other degrees of polymerization may be employed in practicing the present invention. We particularly prefer the commercially available polymers of N-vinyl-2-pyrrolidone having potential K values of from about K15 to K90 which coresponds to average molecular weights as determined by osmometric method (H. P. Frank and G. B. Levy, J. Polymer Sci. 10,371 (1953)) of from about 10,000 in the case of PVP K15 to about 360,000 in the case of PVP K90, PVP K30 having an average molecular weight of about 40,000 and PVP K60 having an average molecular weight of about 160,000.

Reference in the specification and claims to parts, proportions and percentages, unless otherwise specified, refer to parts, proportions and percentages by weight.

Since it is obvious that numerous changes and modifications can be made in the above-described details without departing from the spirit and nature of the invention, it is to be understood that all such changes and modifications are included within the scope of the invention.

What is claimed is:

1. A stable aqueous emulsion containing a resinous graft terpolymer comprising a main chain of about 20–60 weight percent of a polymeric N-vinyl lactam of the formula:

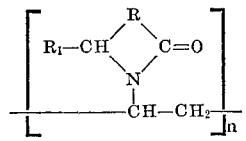

wherein R represents an alkylene bridge group containing from 2 through 4 carbon atoms, $R_1$ represents a member of the group consisting of hydrogen and alkyl and $n$ represents a positive integer representing the degree of polymerization, and having grafted thereon about 40–80 weight percent of an arylalkene monomer and about 1–15 weight percent of an alkyl or aryl vinyl ketone monomer.

2. An emulsion according to claim 1 wherein the arylalkene is of the following formula:

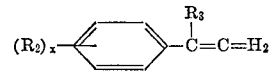

wherein $R_2$ and $R_3$ are hydrogen or alkyl groups of 1 to 7 carbon atoms and $x$ is an integer of 1 to 5.

3. An emulsion according to claim 1 wherein the ketone has the following formula:

wherein $R_4$ is alkyl of 1 to about 7 carbon atoms or phenyl.

4. An emulsion according to claim 1 wherein the terpolymer contains about 30–50 weight percent of polymeric N-vinyl lactam, 50–70 weight percent of arylalkene and 1–7% of vinyl ketone.

5. An emulsion according to claim 1 wherein the polymeric N-vinyl lactam is polyvinylpyrrolidone.

6. An emulsion according to claim 1 wherein the arylalkene is styrene.

7. An emulsion according to claim 1 wherein the vinyl ketone is methyl vinyl ketone.

8. An emulsion according to claim 1 wherein the polymeric N-vinyl lactam is polyvinylpyrrolidone, the arylalkene is styrene and the vinyl ketone is methyl vinyl ketone.

9. An emulsion according to claim 1 wherein the arylalkene is vinyl toluene.

10. An emulsion according to claim 1 wherein the polymeric N-vinyl lactam is polyvinylpyrrolidone. the arylalkene is vinyl toluene, and the vinyl ketone is methyl vinyl ketone.

References Cited

UNITED STATES PATENTS 3,244,657 4/1966 Grosser et al. _____ 260—29.6
3,467,613 9/1969 Barabas et al. _____ 260—29.6

WILLIAM H. SHORT, Primary Examiner

E. A. NIELSEN, Assistant Examiner

U.S. Cl. X.R.

260—23.5 R, 886